United States Patent
Saccoccio et al.

(10) Patent No.: US 10,145,136 B2
(45) Date of Patent: Dec. 4, 2018

(54) SYSTEM AND METHOD OF A POOL FILTER OPERATION

(71) Applicant: Asia Connection LLC, New York, NY (US)

(72) Inventors: Mitch Saccoccio, Clarksville, VA (US); Jonathan Bonelli, New York, NY (US); Reza Afshar, Westlake Village, CA (US)

(73) Assignee: ASIA CONNECTION LLC, New York, NY (US)

( * ) Notice: Subject to any disclaimer, the term of this patent is extended or adjusted under 35 U.S.C. 154(b) by 13 days.

(21) Appl. No.: 15/252,457

(22) Filed: Aug. 31, 2016

(65) Prior Publication Data

US 2017/0056798 A1 Mar. 2, 2017

Related U.S. Application Data (60) Provisional application No. 62/212,267, filed on Aug. 31, 2015.

(51) Int. Cl.
*E04H 4/12* (2006.01)
*B01D 29/66* (2006.01)
*B01D 29/21* (2006.01)

(52) U.S. Cl.
CPC .......... *E04H 4/1209* (2013.01); *B01D 29/21* (2013.01); *B01D 29/668* (2013.01); *B01D 2201/0415* (2013.01); *B01D 2201/0423* (2013.01); *B01D 2201/291* (2013.01)

(58) Field of Classification Search
CPC .... E04H 4/1209; B01D 29/668; B01D 29/21; B01D 2201/0415; B01D 2201/0423; B01D 2201/291

USPC ........ 210/167.12, 167.14, 416.1, 416.2, 424, 210/425, 426, 437
See application file for complete search history.

(56) References Cited

U.S. PATENT DOCUMENTS

| | | | | |
|---|---|---|---|---|
| 4,055,500 A | * | 10/1977 | Parker .................. | B01D 29/114 210/412 |
| 5,906,751 A | * | 5/1999 | Parker .................. | B01D 29/114 137/109 |
| 2002/0027100 A1 | * | 3/2002 | Gershenson ......... | B01D 29/114 210/342 |

(Continued)

FOREIGN PATENT DOCUMENTS

CN 201399276 Y * 2/2010

*Primary Examiner* — Fred Prince
(74) *Attorney, Agent, or Firm* — Dilworth & Barrese, LLP.; Michael J. Musella, Esq.

(57) ABSTRACT

A filter apparatus is disclosed herein that includes a filter, such as a cartridge, positioned within a housing. The housing includes a lower-section housing and a cover assembly removably attached to the lower-section housing. The filter apparatus has multiple ports and valves, such as a valve associated with the cover assembly, so as to allow a user to easily switch between various operations on a pool filter, such as between a backwash mode and a filtration mode. The filter apparatus also employs a cage positioned around the cartridge, thereby between the housing and the filter. The cage provides additional support to the cartridge so as to reduce wear and tear of the cartridge. The cover is rotatable about the lower-section housing so as to allow a user to position ports on the cover in any direction.

11 Claims, 12 Drawing Sheets

(56) References Cited

U.S. PATENT DOCUMENTS

2004/0060853 A1* 4/2004 Dover .................. A01K 63/045
                                                                               210/170.02
2014/0183110 A1* 7/2014 Schlichter .............. B01D 35/12
                                                                               210/108

* cited by examiner

SYSTEM AND METHOD OF A POOL FILTER OPERATION

CROSS-REFERENCE TO RELATED APPLICATIONS

This application claims the benefit of Provisional Patent Application No. 62/212,267, filed Aug. 31, 2015, the entire description of which is incorporated herein by reference.

BACKGROUND

The present disclosure generally relates to a pool filter with an easier and more efficient system and method for cleaning and operating the pool filter.

There are various types of filters that water filtration systems use in order to filter water from a reservoir, such as a pool. Some filters, such as cartridges, may be more fragile than others and too much water pressure can cause damage to the cartridge. Further, some filters are set-up with only a limited number of ports so that during a backwash mode in order to clean waste from the cartridge, a user may have to adjust various hoses, controls and clamps in order to reverse the direction of thee water through the filter. Adjusting the various hoses among the ports on the filter requires extra time and hassle by a user.

SUMMARY

Provided herein is a filter apparatus adapted to more efficiently operate and clean a cartridge within a filter. Additional ports have been added to the filter so that to switch between filtration and backwash mode simply requires adjustment of a few valves, without having to switch hoses or other components among the various ports. A cage surrounding a cartridge within a housing of the filter apparatus may be implemented as well. During backwash mode, the cage provides support and stability to the cartridge to reduce the amount of damage to the cartridge as a result of the water pressure exerted during backwash mode. A cover assembly of the housing further includes a valve therein that allows the changing of the directional flow of the water, such as from filtration mode to backwash mode. In addition, the cover assembly may be positionable at any location on the housing, so that the user is able to control and adjust the direction the ports are facing without having adjust the positioning of the entire housing of the filter.

A cartridge filter is disclosed herein, the cartridge filter includes a housing configured to contain a cartridge filter, the housing including: a lower-section housing; and a cover assembly attached to the lower-section housing, the cover assembly including a valve assembly having an outlet port, an inlet port, an internal port, and a valve positioned within the valve assembly; the cartridge filter apparatus configurable in one of a filtration mode and a backwash mode based on a position of the valve, wherein in the filtration mode water flows through the cartridge filter in a first direction and in the backwash mode water flows through the cartridge filter in a second direction opposite the first direction.

As a further example, the present disclosure discloses a cartridge filter assembly that includes a housing; a cartridge filter positioned within the housing; and a cage positioned around the cartridge filter and between the housing and the cartridge filter.

As another example, a cartridge filter apparatus is disclosed herein, the cartridge filter apparatus includes a housing configured to contain a cartridge filter, the housing including: a lower-section housing; and a cover assembly attached to the lower-section housing, the cover assembly including a cover and a valve assembly having an outlet port, an inlet port, an internal port, and a valve positioned within the valve assembly, the cover being attached to the valve assembly; and a clamp for securing the cover to the lower-section housing of the housing, the cover being rotatably positionable on the lower-section housing, the pool filter being operable regardless of a position the cover is secured to the lower-section housing.

BRIEF DESCRIPTION OF THE DRAWINGS

The present disclosure will become more readily apparent from the specific description accompanied by the drawings.

Like reference numerals indicate similar parts throughout the figures.

DETAILED DESCRIPTION

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

A liquid filter according to the present disclosure includes a cartridge filter within a housing. The housing includes a cover assembly removably attached to a lower-section housing. The filter may be attached or coupled to a pool pump. The cover assembly includes a valve configured to change direction of flow of water within the pool filter, which results in the filter operating in one of a filtration mode or a backwash mode. The cover assembly further includes a valve assembly that has an inlet port and an outlet port that is exposed via openings in a cap of the cover assembly. The valve is able to direct water to the various ports based on the valve position. When the inlet port is opened the filter receives water from the pool pump, and when the outlet port is opened the filter directs the water from the outlet port to the pool. In addition, two ports are positioned on a lower portion of the housing, a second inlet port that receives water from the pool pump and the second outlet port that directs water outside the filter. A cover of the cover assembly is attached to the housing via a nut, wherein the positioning of the cover on the nut is movable. In this regard, the direction that the ports face on the cover assembly can be adjusted 360°. Further, the cartridge includes a cage on an outside portion of the cartridge that provides support for the cartridge during a backwash cycle, such as preventing the cartridge from expanding from the water pressure exerted from backwashing.

Figure 1:
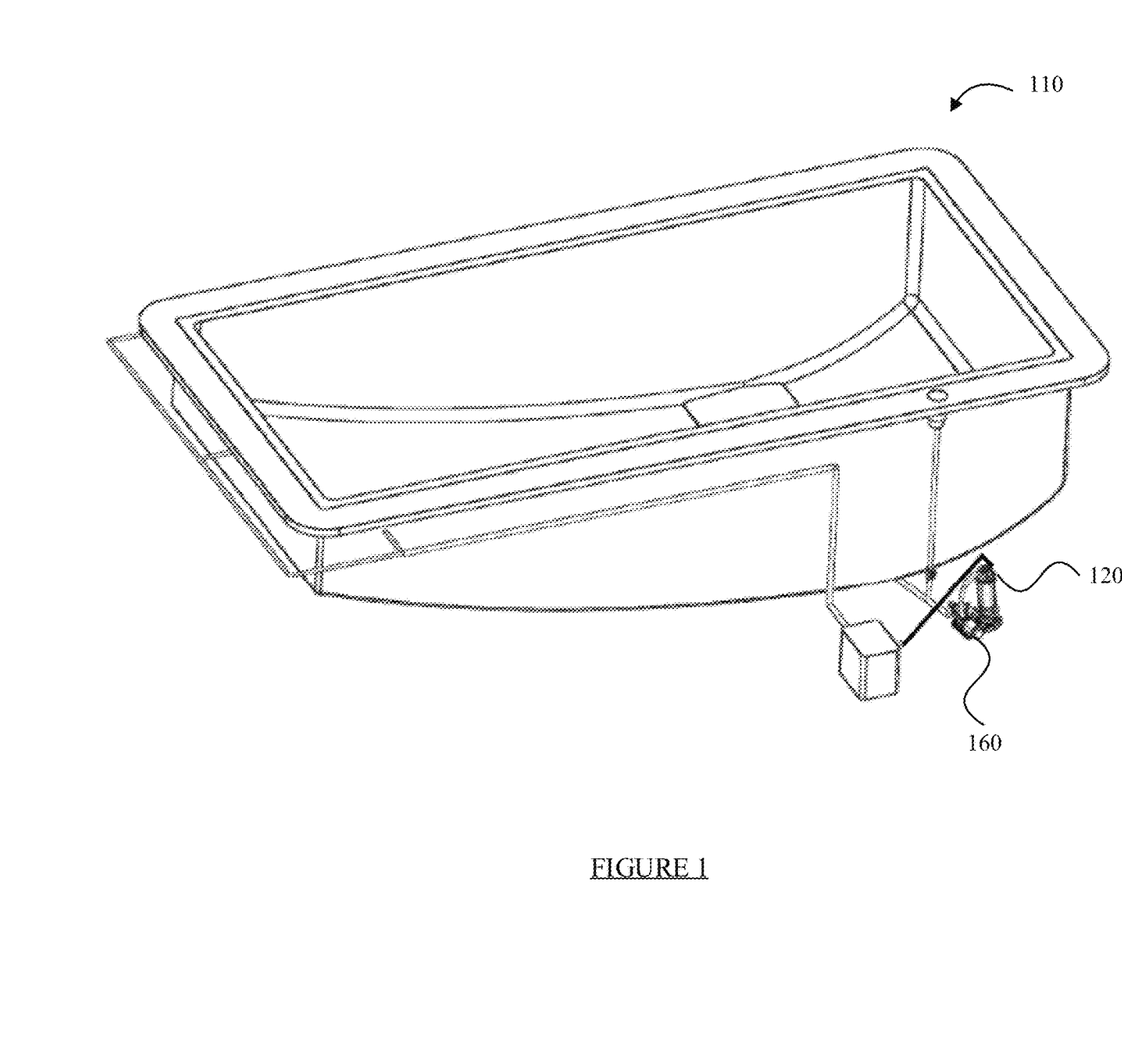
FIG. 1 is an overview of a pool filter operation in accordance with aspects of the present disclosure.

As shown in FIG. 1, filter 120 may be connected to a pool 110. For instance, one pipe or set of pipes may deliver water from pool 120 to pool pump 160 and then to filter 120, and then another pipe or set of pipes delivers water from filter 120 to pool 110. This circuit continues so that filter 120 continues filtering and cleaning the water from pool 110. Although pool 110 is shown in the example of FIG. 1, any reservoir that houses water or other liquid may be used in conjunction with filter 120, such as a pond, spa, etc.

As illustrated in FIGS. 2A-E, housing 222 of filter 120 includes a lower-section housing 224 that houses a cartridge and a cover assembly 226 positioned above lower-section housing 224, cover assembly 226 being removably attachable to lower-section housing 224.

Figure 2A:
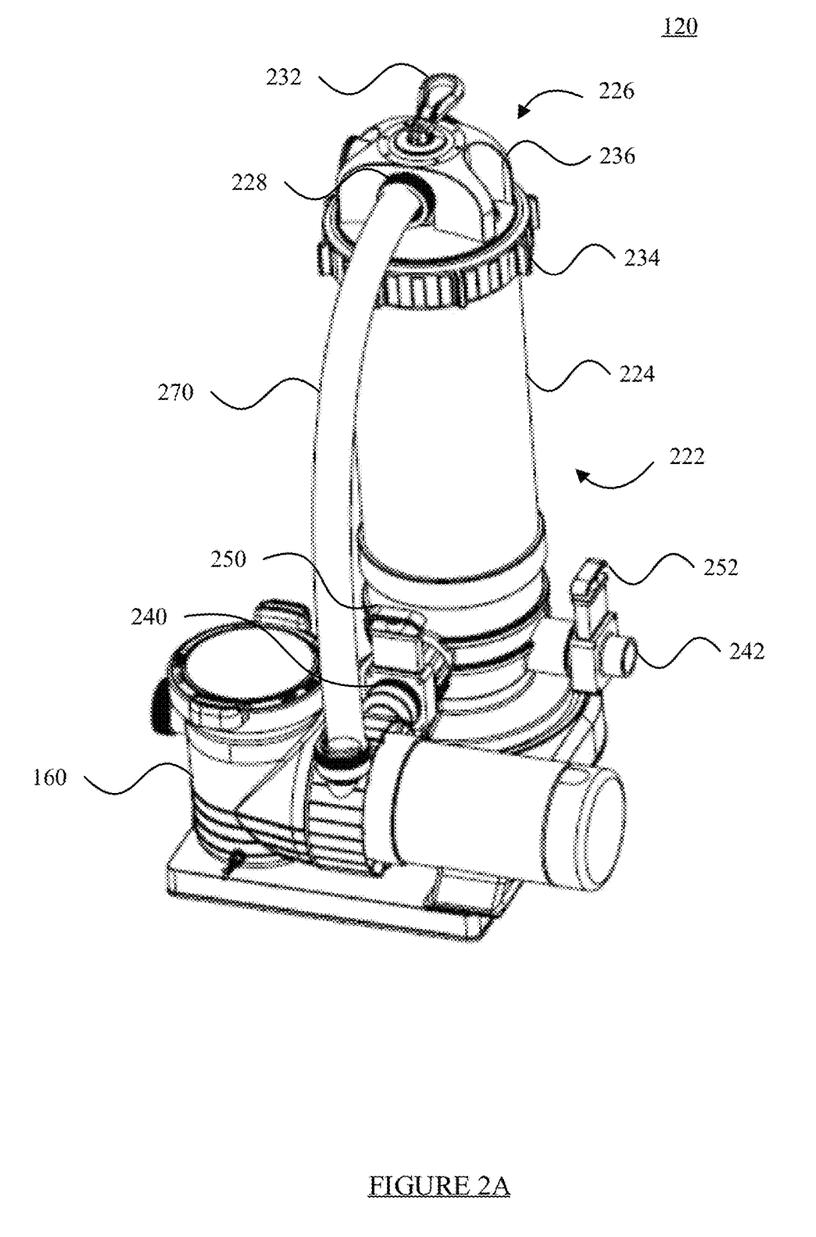
FIGS. 2A-C depict various views of the pool filter in accordance with aspects of the present disclosure.
Figure 2B:
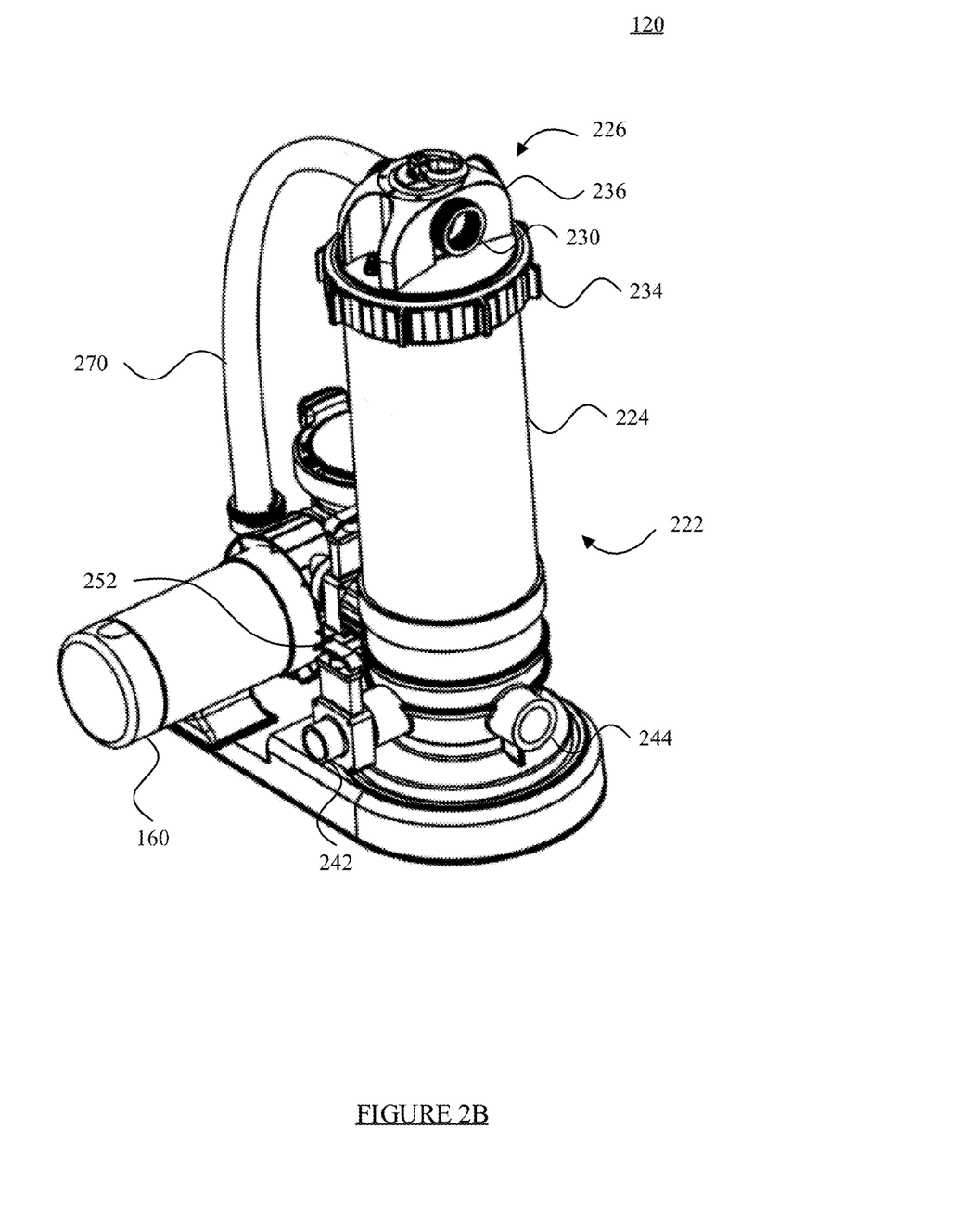
Figure 2C:
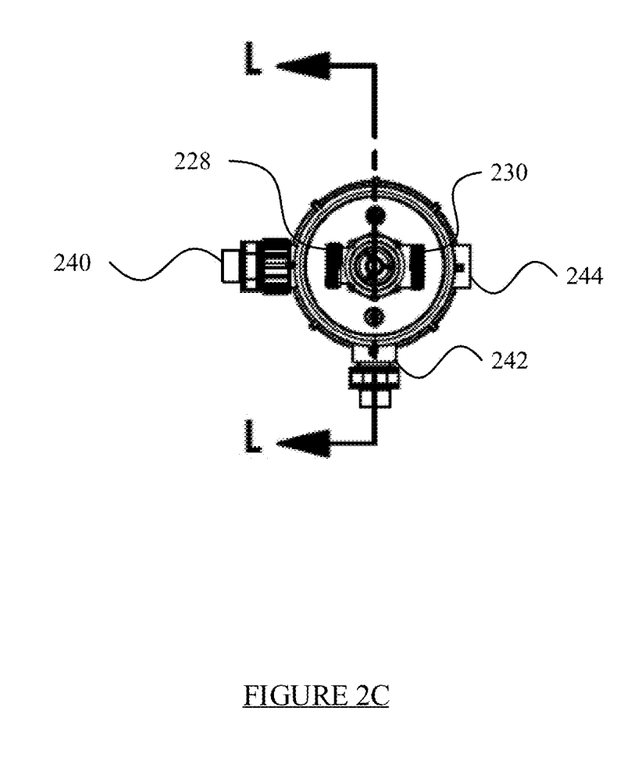

Lower-section housing 224 includes a valve 250 that opens and closes second inlet port 240 and a second valve 252 that opens and closes second outlet port 242. As shown in FIG. 2B, lower-section housing includes a third outlet port 244 that serves as an additional port for waste. Third outlet port 244 may not be necessary, and may typically be capped off. As discussed in further detail below, water may enter second inlet port 240 from pool pump 160 in the filtration mode, and water along with waste may exit second outlet port 242 in the backwash mode.

Figure 2D:
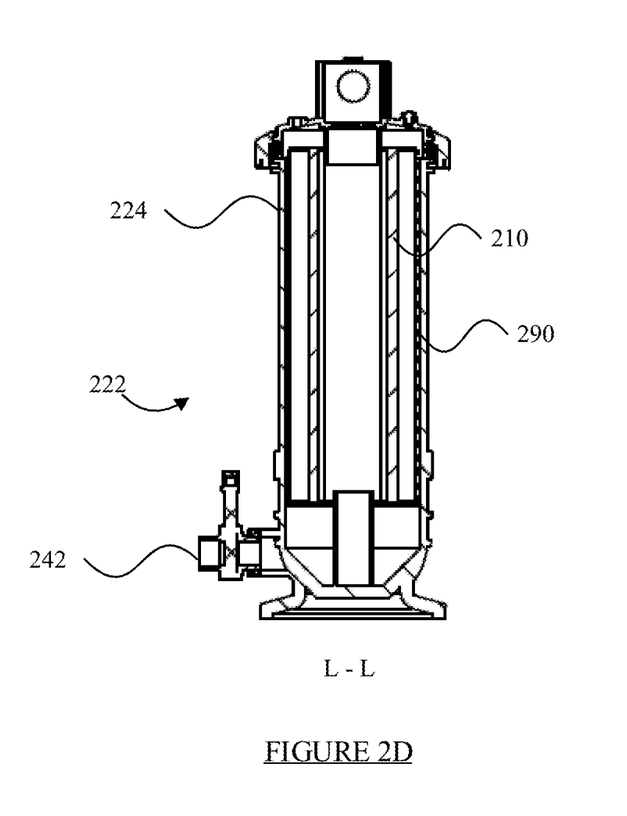
FIG. 2D is a cross-sectional view of the pool filter in accordance with aspects of the present disclosure.
Figure 2E:
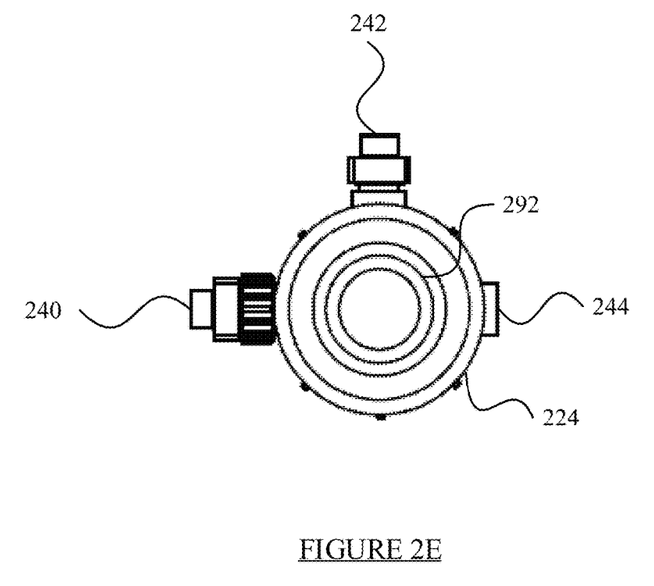
FIG. 2E illustrates an internal cavity of a lower-section housing of the pool filter in accordance with aspects of the present disclosure.

FIG. 2E shows inside lower-section housing 224 and the various ports on filter 120 that lead therein. FIG. 2E illustrates the inside structure of lower-section housing 224, and thereby the structure in which water will flow. For example, barrier 292 may extend parallel to lower-section housing 224, and separates an outside perimeter inside of lower-section housing 224 from a cavity of cartridge 210. When cartridge 210 is positioned within lower-section housing 224, barrier 292 may end at or near a lower end of cartridge 210, so that water is able to flow through and be filtered by cartridge 210. For example, water may flow up lower-section housing 224 from an outside portion of cartridge 210 to an inside portion of cartridge 210, or vise versa. In addition and with reference to FIG. 2D, a cage 290 is positioned around cartridge 210, which provides additional support to cartridge 210, as discussed in further detail below.

As an alternative, during backwash mode second outlet port 242 may be closed and a separation tank may be implemented, which catches particles within the water. The captured particles in the separation tank may exit from third outlet port 244, which may be opened during backwash mode or closed and then subsequently opened. Water may or may not exit third outlet port 244 during the backwash cycle as well. Alternatively, third outlet port 244 may only be used for the larger particles and waste that are filtered by the separation tank.

Figure 2F:
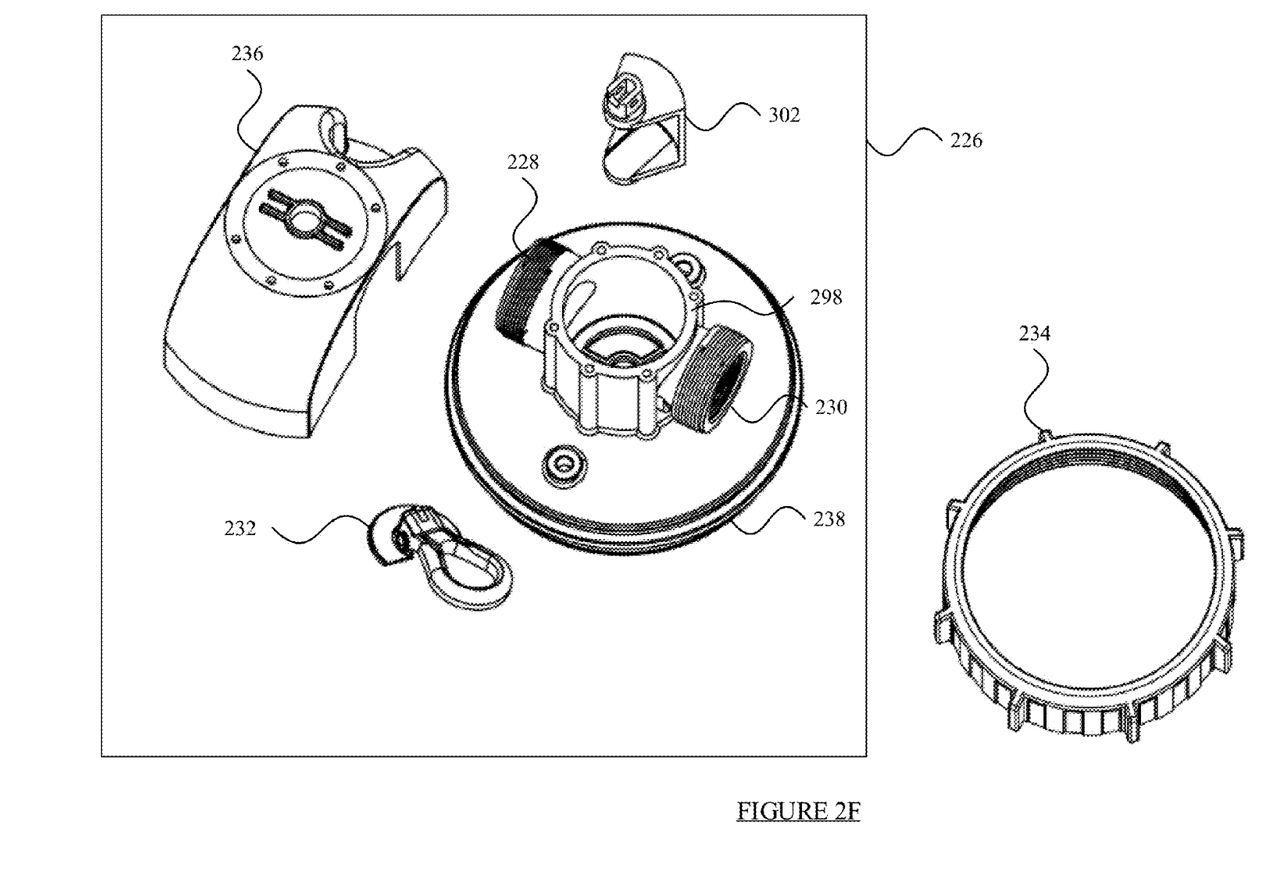
FIG. 2F is a disassembled view of a cover assembly and nut in accordance with aspects of the present disclosure.
Figures 3A, 3B, 3C:
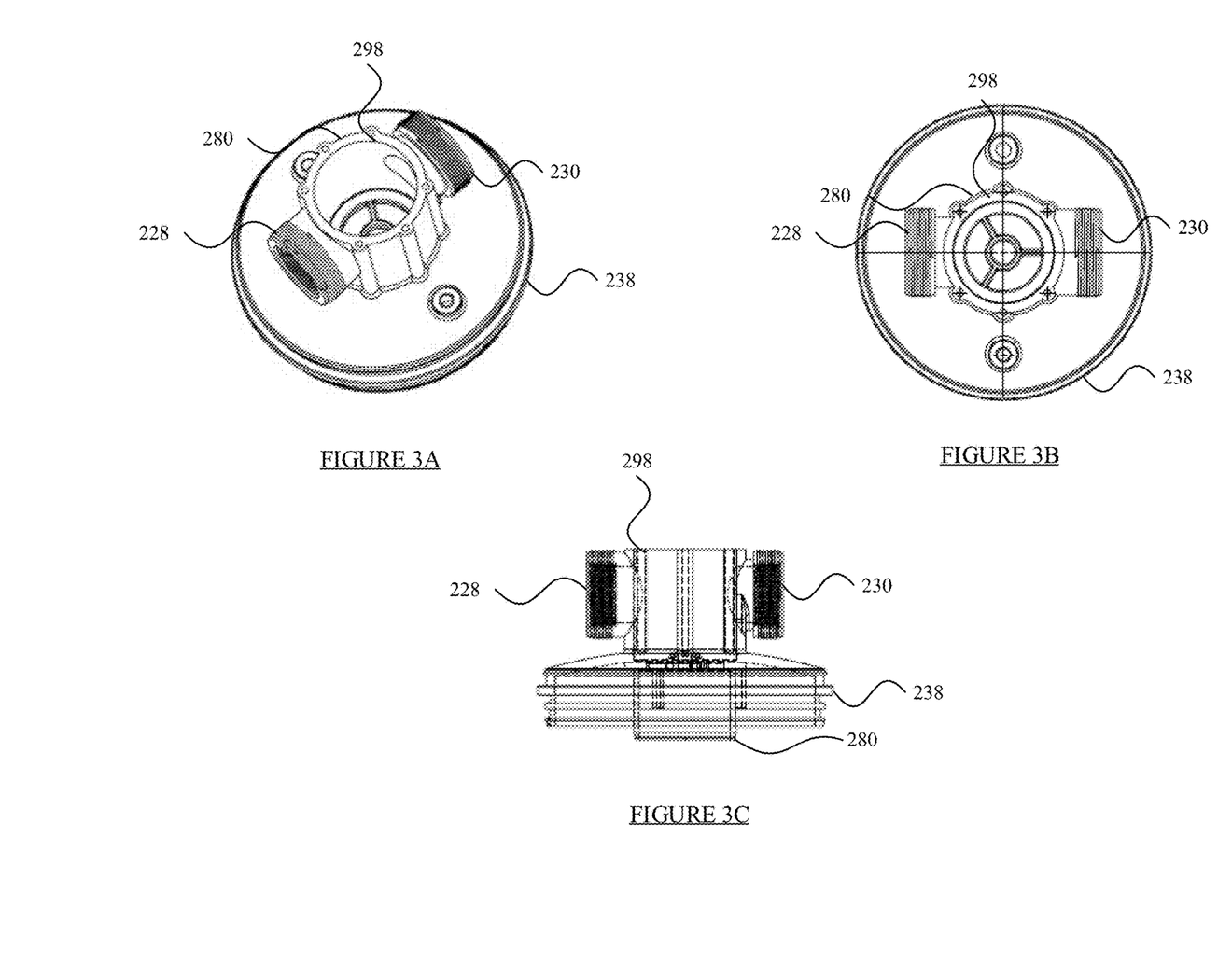
FIGS. 3A-C depict various views of a valve assembly of the pool filter in accordance with aspects of the present disclosure.

As illustrated in FIG. 2F, cover assembly 226 includes cover 238, cap 236, valve assembly 298, diverter 302 and handle 232 to change the flow of water using diverter 302. Nut 234 is also illustrated in FIG. 2F. Inlet port 228 and outlet port 230 are formed with valve assembly 298, and are exposed from respective openings in cap 236 so that a user is able to access inlet port 228 and outlet port 230. Cover assembly 226 can include a pressure gauge and/or pressure relief valve. As described in further detail below, valve assembly 298 may be permanently attached to cover 238, such that any re-positioning or adjustment of cover 238 corresponds to the re-positioning of inlet port 228 and outlet port 230. In addition, valve assembly 298 may be attached to cap 236, such as using nuts and bolts or other connecting mechanism. In this regard, movement of cover 238 will allow for the openings on cap 236 to correspond with inlet port 228 and outlet port 230 of valve assembly 298.

As an alternative, valve assembly 298 may be connected with lower-section housing 224 at other locations as well. For example, valve assembly 298 may be positioned at a base of lower-section housing 298, such that water may enter and exit filter 120 from a bottom thereof. For example, referring back to FIG. 2E, this figure illustrates a base of lower-section housing 224 in which valve assembly 298 may be positioned at. As one example, valve assembly 298 may be positioned at a center thereof, in which case an internal port extends into lower-section housing 224. In this regard, a diverter, such as diverter 302, may be connected to a handle or other device that is able to adjust the positioning of diverter 302. As a result, the diverter will adjust which port on valve assembly 298 is opened or closed, and thereby whether filter 120 is operating in backwash or filtration mode.

Cover assembly 226 is attached to lower-section housing 224 of filter 120 via a nut 234 which allows cover assembly 226 to adjust the direction in which valve assembly 298 and cap 236 are positioned on lower-section housing 224. As discussed in further detail below and shown in the figures, cover assembly 226 includes cover 238, which contains a threaded portion for nut 234 to attach to. Nut 234 may be ring-shaped and secured on an outside portion of cover assembly 226 and lower-section housing 224. Cover 238 of cover assembly 226 and lower-section housing 224 may have corresponding threads with nut 234, so that nut 234 can secure thereto. As an alternative to using threaded nut 234 to seal cover 226 to lower-section housing 224, the connection may be using a clip-on or snap-on, or a clamp.

Cover assembly 226 may be pressed inside of lower-section housing 224 and sealing occurs using an "O" ring through radial seal. In this regard, as long as cover 238 of cover assembly 226 is pressed inside of lower-section housing 224 the hermitic seal takes place and nut 234 will secure the lid so as to not allow pressure to escape. For additional safety a lock may be provided at a side of nut 234 to hold nut 234 from rotation after being secured. In this regard, cover assembly 226 does not have to fit in a particular, stagnant direction at all times, but rather cover assembly 226 and valve assembly 298 can be adjusted 360° to allow a user to direct the various ports on cover assembly 226 in a manner that is suitable for the user. For instance, a user may want to direct internal backwash port 228 and external pool port 230 in particular directions that are most convenient for setting up all of the components of pool filter 120 in the given environment.

Referring now to FIGS. 3A-D, valve assembly 298 includes inlet port 228, outlet port 230 and internal port 280. Valve assembly 298 may be attached to cover 238 so that, when filter 120 is assembled, inlet port 228 and outlet port 230 may be automatically moved with cover 238. For example, although pool filter 120 itself may be attached to a base, the user is still able to re-position the ports on valve assembly 298 to orient them in a position that is most favorable to the environment and surroundings of the user. Internal port 280 may extend into lower-section housing 224, and even further within an inside portion of cartridge 210. In this regard, an outside diameter of internal port 280 substantially fits within an inside diameter of cartridge 210, to allow water to seamlessly flow between cover 238 and lower-section housing 224. Furthermore, by having valve assembly 298 permanently attached to cover 238, less pressure is lost during operation of filter 120 since no tubes or other adapters are used to transfer water. Other systems that use tubes or adapters to connect between cover 238, inlet port 228, outlet port 230, and lower section housing 224 may lose pressure as a result of the additional pieces. In addition, incorporating valve assembly 298 to cover 238 also reduces cost in manufacturing.

Referring back to FIG. 2F, diverter valve 302 may rest on a base within internal port 280 to divert water as the water enters one of the ports on valve assembly 298. A top portion of diverter valve 302 may connect to handle 232 through cap 236, and rotation of handle 232 adjusts the positioning of diverter valve 302, which thereby either opens or closes inlet port 228 or outlet port 230. Based on which port of valve assembly 298 is opened or closed by diverter valve 302, filter 120 may operate in either filtration mode or backwash mode. In this regard, the positioning of handle 232 determines which mode filter 120 operates in, that is, filtration mode or backwash mode. It should be understood that although handle 232 is described as controlling the mode of filter 120, other mechanisms and means for altering the functionality of filter 120 are also possible. For example, other types of controls, whether mechanically based or electronically based, may control and adjust the mode of the filter.

In filtration mode, diverter valve 302, via handle 232, opens outlet port 230 and closes inlet port 228. Referring to FIG. 2A, during the filtration mode inlet valve 250 associated with second inlet 240 is in the opened position, and outlet valve 252 associated with second outlet 242 is in the closed position.

During filtration mode the pool water enters pool pump 160, travels to second inlet port 240, continues to travel up lower-section housing 224 through cartridge 210 of pool filter 120, and then exits outlet port 230 which directs the water back to the pool. Referring to FIG. 2D, when water enters housing 222, the water flows upward within lower-section housing 224 on a periphery of cartridge 210. From here, the water flows through cartridge 210 toward and into the inside diameter of cartridge 210, in order to enter internal port 280, which subsequently directs the water to outlet port 230 and ultimately to the pool. Cartridge 210 cleans or otherwise filters the water as the water moves therethrough, and then is ultimately delivered back to the pool.

In backwash mode, diverter valve 302, via handle 232, opens inlet port 228 and closes outlet port 230. Furthermore, during the backwash mode inlet valve 250 associated with second inlet 240 is in the closed position, and outlet valve 252 associated with second outlet 242 is in the opened position During backwash mode the pool water enters pool pump 160, travels up tube 270 to inlet port 228 enters internal port 280 and moves through cartridge 210 and lower-section housing 224, until the water ultimately exits second outlet port 242. In backwash mode, however, when the water enters lower-section housing 224 via internal port 280, the water moves from the inside of cartridge 210 and travels to the outside of cartridge 210, which allows for the water to clean cartridge 210. When the water passes through cartridge 210, the water and any waste that is collected is directed outside of filter 120 through second outlet port 242, which may lead to a drain, the grass, etc.

By having two external ports, namely outlet port 230 and second outlet port 242, a user does not need to switch tubes, hoses, clamps, etc. when switching between backwash mode and filtration mode. Furthermore, pool filter 120 itself is simplified by having these two outlet ports. The advantage of such a system not only reduces manufacturing of pool filter 120 itself, but also reduces the work by a user when switching between filtration and backwash mode.

Furthermore, pool pump 160 is able to deliver water to inlet port 228 and second inlet port 240 by having two ports to direct the water. For example, as described in application Ser. No. 14/566,220, filed Dec. 10, 2014, the contents of which is hereby incorporated herein by reference, a pool pump that includes two outlet ports that are respectively oriented in vertical and horizontal directions. The water within pool pump 160 will be directed based on which inlet is opened and closed on the filter, such as inlet port 228 or second inlet port 240 on filter 120.

As an alternative, another diverter valve may be implemented on pool pump 160, such as a T-valve, that is able to open and close the ports to filter 120. In this scenario, some of the valves on filter 120 may not be necessary since the valves on pool pump 160 is able to control the directional flow of the water.

Figure 4A:
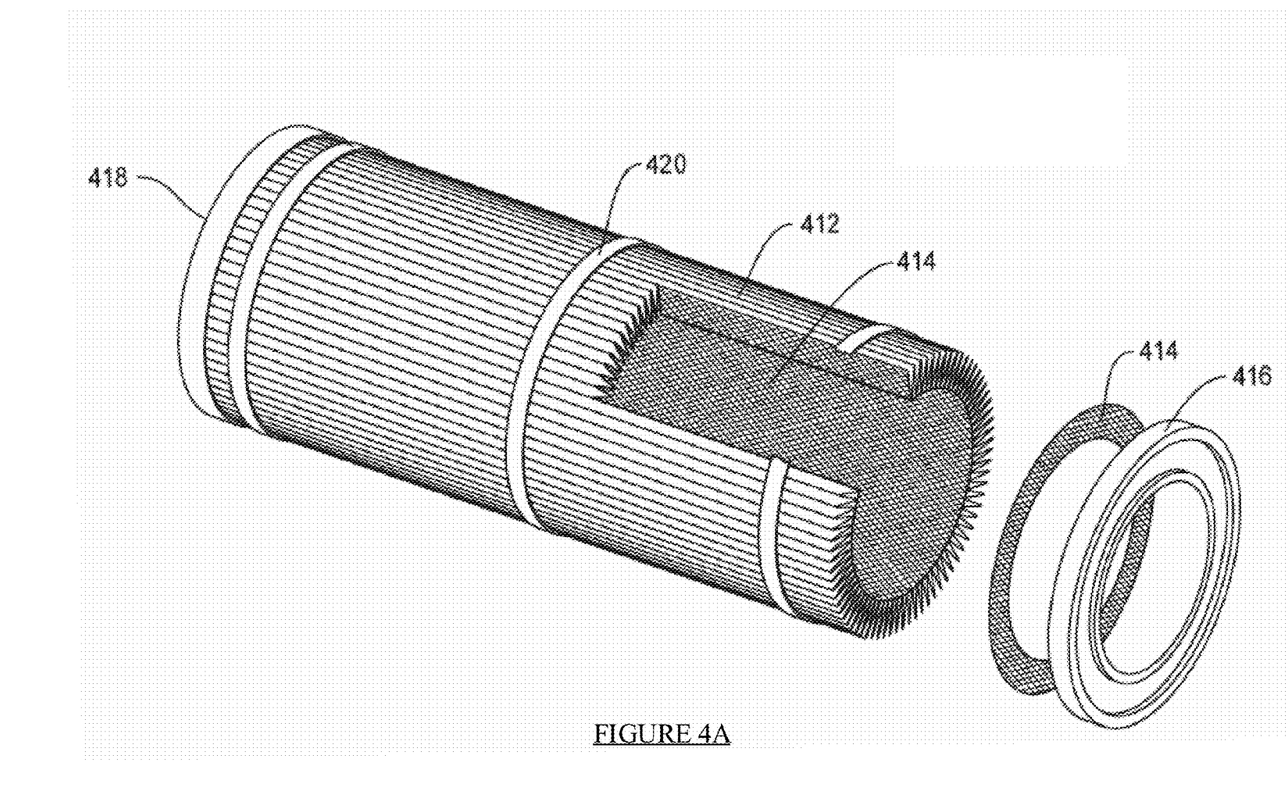
FIGS. 4A-B depict a filter cartridge of the pool filter in accordance with aspects of the present disclosure.
Figure 4B:
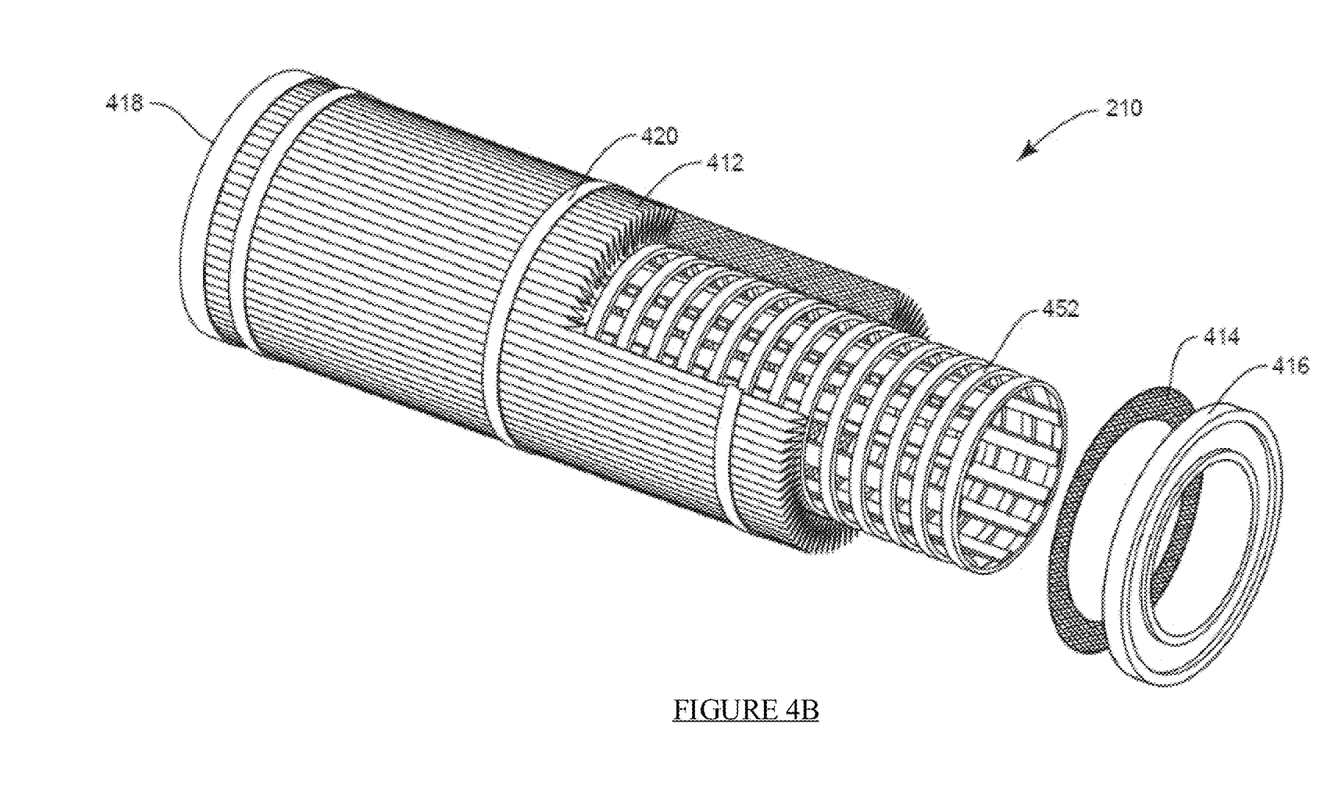
Figure 5A:
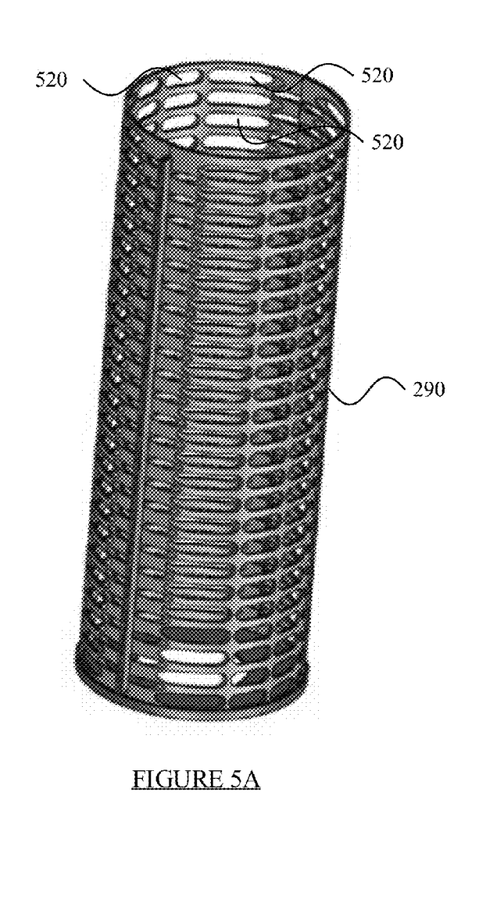
FIG. 5A-B are perspective views of a cage used with the filter cartridge in accordance with aspects of the present disclosure.
Figures 5B, 5C, 5D:
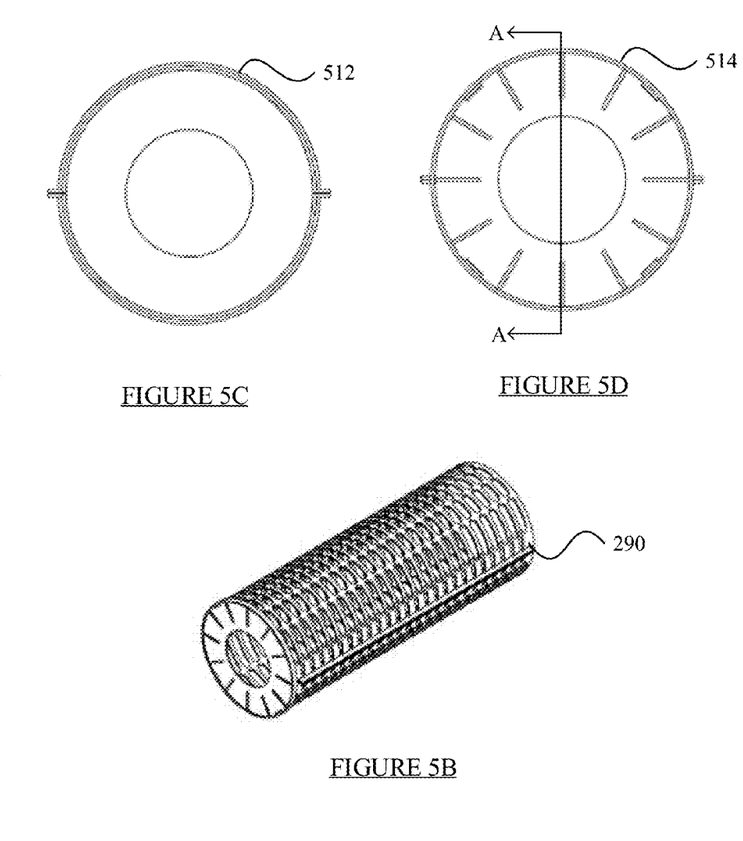
FIGS. 5C-D is a lid and a base, respectively, of the cage in accordance with aspects of the present disclosure.
Figure 5E:
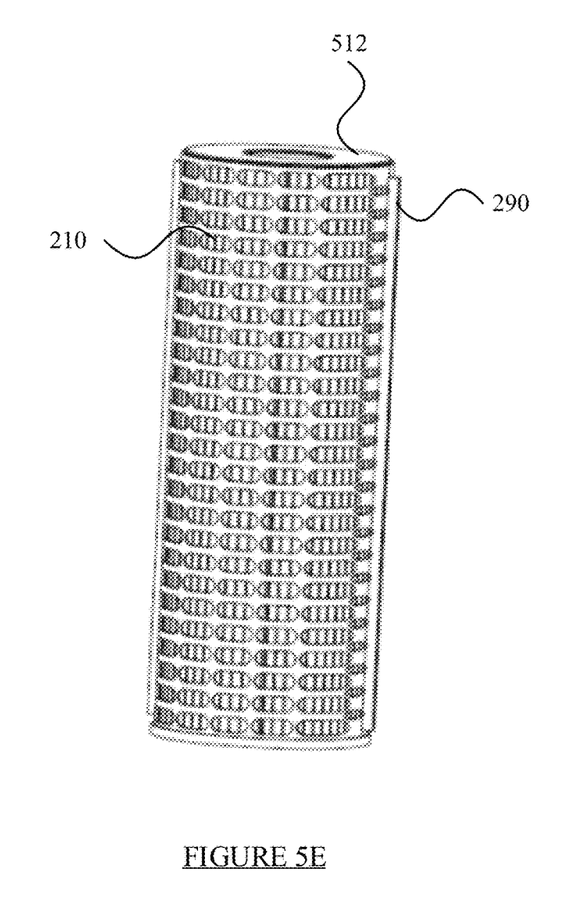
FIG. 5E illustrates the filter cartridge positioned within the cage in accordance with aspects of the present disclosure.
Figure 5F:
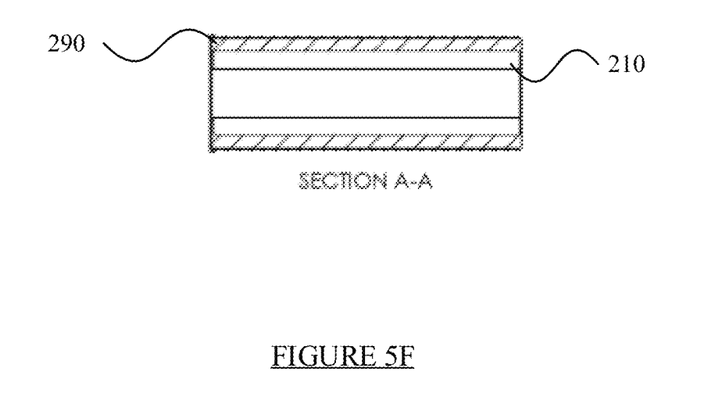
FIG. 5F is a cross-sectional view of the cage with the cartridge of FIG. 5D in accordance with aspects of the present disclosure.

Inside lower-section housing 224 of housing 222 is cartridge filter 210, but other filters are also possible and the present disclosure should not be limited thereto. As depicted in FIGS. 4A-B, cartridge 210 implements fan-pleat substrate 412 (e.g., Reemay® Material), chain link webbing 414, mesh reinforced polyethylene end caps 416 and 418, and one or more reinforced with pleat banding 420 surrounding at least a portion of cartridge 210. Chain link webbing 414 may be comprised of metal, plastic, etc., and provides for more efficient use of the fan-pleat substrate 412 material. As illustrated in FIGS. 4A-B, chain link webbing 414 may be positioned along an inner diameter of cartridge 210, and also on at least one of a top and bottom of cartridge 210. When water flows through cartridge 210, chain link webbing 414 helps keep spacing within the pleats of fan-pleat substrate 412, so that the pleats do not collapse. By maintaining the spacing in between the pleats, fan-pleat substrate 412 is able to gather more waste, debris, etc. when filtering the water. In addition, since the pleats do not collapse as a result of chain link webbing 414, cartridge 210 overall is able to last longer than if chain link webbing 414 was not employed.

A central core 452 is positioned within a cavity of cartridge 210, and the cavity is defined by a perimeter of cartridge 210. Central core 452 is at least partially positioned within the cavity of cartridge 210, and extends at least partially along a longitudinal axis of the cavity. Central core 452 may be comprised of metal, plastic or any other material sufficient to provide support to cartridge 210 when under water pressure. Central core 452 helps provide support for the internal portion of cartridge 210, such that when water flows from an outside portion of cartridge 210 through to an inside portion of cartridge 210, cartridge 210 will not collapse.

In addition, the holes in central core 452 allow for uniformly distributed water on both sides of cartridge 210. For example, water may travel through the holes of central core 452, thereby allowing the water to travel uniformly through both sides of cartridge 210. The more stable pleats as a result of the various reinforcements, such as the chain link webbing, allows for consistent water flow and distribution of the filtered dirt on the pleated substrate. It should be noted, however, that the present disclosure is not restricted to a particular cartridge, filter media, or brand of pleats, but rather any filter may be implemented with filter 120 in order to implement the technology disclosed herein. For instance, the cartridge may be a sand cartridge, charcoal cartridge, etc. which may also work with the present disclosure.

The design of central core 452 is not limited to any particular shape or size, and the openings therein are not restricted to a particular design, shape, size or amount as well. For instance, central core 452 may be designed to fit the overall structure of cartridge 210 to provide support to that particular cartridge 210. In addition, although the length of central core 452 may correspond to a length of cartridge 210, it does not have to so long as central core 452 is capable of providing support to cartridge 210. Conversely, central core 452 may only protect portions of cartridge 210, such as portions of cartridge 210 that tend to damage quickest. In a further embodiment, cartridge 210 may come pre-installed within central core 452. In addition. Although openings 520 form a cylindrical shape on cartridge 210, any number of shapes and sizes are available as well, including circular, square, rectangular, etc.

In an additional embodiment, multiple central cores may also be used and combined within the cavity of cartridge 210, each central core having a different or same design (e.g., amount, size, and shape of openings, overall strength of central core, etc.), as described above. For instance, if two central cores are used, then a first central core may have smaller openings relative to a second central core, which has larger openings. As another example, the first central core may have triangular openings and the second central core may have circular openings. Any number of these combinations of different sizes and shaped central cores are possible. Furthermore, one section of the cartridge and central core may receive more water pressure than other sections of the cartridge and central core. Therefore, using more than one central core around the cartridge may make it easier to replace just that one section of the central core as opposed to an entirely new central core when only a section thereof has been damaged.

As discussed above, when filter 120 is operating in backwash mode water pressure is exerted against cartridge 210. FIGS. 5A-F depict a cage 290 that is positioned around an outside portion of cartridge 210, which absorbs and relieves some of the water pressure exerted against cartridge 210. Cage 290 may be comprised of plastic or metal, any combination thereof, or any other material strong enough to provide support to cartridge 210, as described herein. Cage 290 further includes a cap 512 and a base 514 that are positioned on a first end and a second end of cage 290, respectively. Cap 512 and base 514 may provide additional support to the upper and lower regions of the cage and also the cartridge itself. For instance, cap 512 and base 514 may prevent water from damaging the ends of cartridge 210. In addition, cap 512 and base 514 may provide additional support to the upper and lower portions of cage 290, such as by supporting cage 290 from expanding from the water pressure.

Cage 290 may provide support to cartridge 210 so that the pressure exerted by the water does not cause cartridge 210 to expand beyond the capacity of cartridge 210. For instance, if the backwash mode of the particular pool filter is overwhelmingly strong, then the pressure from the water may cause damage to cartridge 210. Damage may include rips, tears, holes, etc. to cartridge 210. However, with the additional support provided by cage 290, cartridge 210 may not be able to expand beyond its capacity, thereby reducing the amount of damage caused to cartridge 210.

Cage 290 includes a plurality of openings 520 throughout and forms a cylindrical shape outside cartridge 210. Openings 520 throughout cage 290 allow the free-flow of water through cage 290, thereby not interfering with the filtration or backwash processes of pool filter 120.

The design of cage 290 is not limited to any particular shape or size, and openings 520 are not restricted to a particular design, shape, size or amount as well. For instance, cage 290 may be designed to fit the overall structure of cartridge 210 to provide support to that particular cartridge 210. In addition, although the length of cage 290 may correspond to a length of cartridge 210, it does not have to so long as cage 290 is capable of providing support to cartridge 210. Conversely, cage 290 may only protect portions of cartridge 210, such as portions of cartridge 210 that tend to damage quickest. Moreover, although cage 290 includes lid 512 and base 514 that are removably attachable to cage 290, lid 512 and base 514 may alternatively be one complete unit with cartridge 210. For example, base 514 may be permanently attached to cage 290, and lid 512 may be open for the cartridge to slide in, or vise versa. As an alternative, lid 512 or base 514 may be attached to cage 290 via a hinge mechanism. In a further embodiment cartridge 210 may come pre-installed within cage 290, such that lid 512 and base 514 are permanently sealed with cartridge 210 within cage 290. In addition, Although openings 520 form a cylindrical shape on cartridge 210, any number of shapes and sizes are available as well, including circular, square, rectangular, etc.

Openings 520 may also define the water path that the water travels in. Since the water has to go through openings 520 that are created by cage 290, cage 290 at least partially determines the flow of the water. In this regard, a size, shape, and positioning of openings 520 may be configured to optimize the performance of pool filter 120. For instance, the size, shape, and positioning of the various openings 520 may be designed and configured to optimize the flow of water within lower-section housing 224, since openings 520 throughout cage 290 are able to direct where the water flows. For example, water cannot flow through the structure of cage 290, but by being able to flow through openings 520, the flow of water is able to be controlled in a manner to maximize water flow.

Further, cage 290 may have adjustable openings in that cage 290 itself is able to alter its design. For example, in the backwash cycle the cleansing of the filter may be restricted to the particular sizes or shapes of openings 520. Thus, by having an adjustable cage with respect to the size and shape of the openings and the positioning thereof, other parts of the cartridge can be cleaned as well in subsequent backwash cycles. Lid 512 and base 514 may include one or more openings for water to flow through as well.

Cage 290 may be positioned anywhere between cartridge 210 and lower-section housing 224 of pool filter 120. Thus, cage 290 may be comfortably snug against cartridge 210 or with a distance between cartridge 210 and cage 290. The positioning of cage 290 relative to lower-section housing 224 may also depend on the particular cartridge used, such as based on the size of the cartridge. A space is provided between cage 290 and lower-section housing 224 for water to flow therein. The cartridge may be made of a weaker material such that it is typically washed in a more fragile manner, in which case cage 290 may be positioned closer to cartridge 210 than if cartridge 210 was a more resistant and stronger type filter.

In an additional embodiment, multiple cages may also be used and combined around cartridge 210, each cage having a different or same design (e.g., amount, size, and shape of openings, overall strength of cage, etc.), as described above. For instance, if two cages are used, then a first cage may have smaller openings relative to a second cage, which has larger openings. As another example, the first cage may have triangular openings and the second cage may have circular openings. Any number of these combinations of different sizes and shaped cages are possible. Furthermore, one section of the cartridge and cage may receive more water pressure than other sections of the cartridge and cage. Therefore, using more than one cage around the cartridge may make it easier to replace just that one section of the cage as opposed to an entirely new cage when only a section thereof has been damaged.

As another embodiment, the rotation of cover assembly 226 about lower-section housing 224 does not affect the functionality of handle 232, and valve assembly 298. Rather, valve assembly 298 is still able to adjust its positioning regardless and independent of the 360° movement of cover assembly 226.

As a result of the foregoing, a user is able to easily switch between filtration mode and backwash mode simply by adjusting some valves, without having to switch tube connections among various ports. For instance, the user can use the handle of the filter to adjust the filter from a filtration mode to the backwash mode, which adjusts a diverter within the filter from closing the outlet port and opening the inlet port. From here, the user simply has to close the second inlet port and open the second outlet port, thereby allowing the water to and waste to exit the pool filter from the second outlet port. In addition, by implementing the cage around the cartridge a user is able to operate the filter in backwash mode without having to worry about the cartridge succumbing to damage. Finally, based on the overall set-up of a given user's surrounding environment, which may be affected by trees, sheds, or other structures, the user is able to adjust the positioning of the cap, which allows the user to direct the flow of the ports on the cover assembly in a manner that is best suitable for the user.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A cartridge filter apparatus, comprising:
   a housing configured to contain a cartridge filter having an inside surface and an outside surface, the housing including:
      a lower-section housing having a housing inlet port and a housing outlet port;
      a cover assembly attached to the lower-section housing; and
      a valve assembly attached to the cover assembly having an outlet port, an inlet port, an internal port extending into the lower-section housing and at least partially into the cartridge filter, and a valve positioned within the valve assembly;
   the cartridge filter apparatus configurable in one of a filtration mode and a backwash mode based on a position of the valve,
   wherein in the filtration mode water flows through the cartridge filter in a first direction from the outside surface of the cartridge filter to the inside surface of the cartridge filter and in the backwash mode water flows through the cartridge filter in a second direction opposite the first direction from the inside surface of the cartridge filter to the outside surface of the cartridge filter,
   wherein in the filtration mode the valve is positioned to open the outlet port and close the inlet port and in backwash mode the valve is positioned to open the inlet port and close the outlet port,
   wherein in the filtration mode water is directed from the housing inlet port through the cartridge filter in the first direction from the outside surface of the cartridge filter to the inside surface of the cartridge filter, through the internal port, and to the outlet port, and
   wherein in the backwash mode water is directed from the inlet port, through the internal port, through the cartridge filter in the second direction from the inside surface of the cartridge filter to the outside surface of the cartridge filter, and to the housing outlet port.

2. The cartridge filter apparatus of claim 1, wherein the internal port having an outside diameter that substantially corresponds with an inside diameter of the cartridge filter.

3. The cartridge filter apparatus of claim 1, wherein the valve assembly is attached to the cover assembly.

4. The cartridge filter apparatus of claim 3, further comprising:
   a clamp for securing the cover assembly to the lower-section housing of the housing, the cover being rotatably positionable on the lower-section housing, the pool filter being operable regardless of a position the cover assembly is secured to the lower-section housing.

5. The cartridge filter apparatus of claim 1, further comprising a second valve to open and close the second outlet port.

6. The cartridge filter apparatus of claim 1, further comprising a cage positionable around the cartridge filter and between the housing and the cartridge filter.

7. The cartridge filter apparatus of claim 1, further comprising a water pump to provide water to the housing.

8. The cartridge filter apparatus of claim 1, wherein the cartridge filter defines a cavity therein that is defined by an internal perimeter of the cartridge filter, the cartridge filter apparatus further comprising:
   a central core positioned at least partially within the cavity of the cartridge filter and extending at least partially along a longitudinal axis of the cavity, the central core including a plurality of holes.

9. The cartridge filter apparatus of claim 1, further comprising a cage positioned around the cartridge filter and between the housing and the cartridge filter.

10. The cartridge filter apparatus of claim 9, wherein the cartridge filter includes:
- a longitudinal portion;
- a first end positioned on one end of the longitudinal portion; and
- a second end opposite the first end and positioned on another end of the longitudinal portion; and
- the cage completely surrounds the longitudinal portion of the cartridge.

11. The cartridge filter apparatus of claim 10, further comprising:
- a cap; and
- a base;
- the cap and the base are removably attached to a first end of the cage and a second end of the cage.

* * * * *